United States Patent
Ono

(10) Patent No.: US 6,573,463 B2
(45) Date of Patent: Jun. 3, 2003

(54) STRUCTURE OF ELECTRONIC INSTRUMENT HAVING OPERATION KEYS AND MANUFACTURING METHOD THEREOF

(75) Inventor: Shuichi Ono, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/904,495

(22) Filed: Jul. 16, 2001

(65) Prior Publication Data

US 2002/0005791 A1 Jan. 17, 2002

(30) Foreign Application Priority Data

Jul. 17, 2000 (JP) ........................................ 2000-216250

(51) Int. Cl.7 .............................................. H01H 13/70
(52) U.S. Cl. ................... 200/5 A; 200/517; 200/302.2; 200/341
(58) Field of Search .......................... 29/622; 200/5 A, 200/512, 517, 341, 302.1, 302.2

(56) References Cited

U.S. PATENT DOCUMENTS

| | | | |
|---|---|---|---|
| 5,399,821 A | * 3/1995 | Inagaki et al. | 200/341 |
| 5,475,192 A | * 12/1995 | Inagaki et al. | 200/341 |
| 5,489,754 A | 2/1996 | Dirmeyer et al. | 200/302.1 |
| 5,807,002 A | * 9/1998 | Tsai | 200/311 |
| 6,023,033 A | * 2/2000 | Yagi et al. | 200/512 |
| 6,064,019 A | * 5/2000 | Buchan et al. | 200/302.2 |
| 6,093,900 A | 7/2000 | Wisskirchen et al. | 200/302.2 |
| 6,103,346 A | * 8/2000 | Nakajo et al. | 200/341 |
| 6,180,895 B1 | * 1/2001 | Hutchinson et al. | 200/5 A |
| 6,180,896 B1 | * 1/2001 | Naritomi | 200/5 A |
| 6,355,890 B1 | * 3/2002 | Kuroda | 200/5 A |

FOREIGN PATENT DOCUMENTS

| | | | |
|---|---|---|---|
| DE | 197 15 536 A 1 | 10/1998 | H05K/5/02 |
| EP | 0 616 345 A1 | 9/1994 | H01H/13/70 |
| JP | 6-22348 | 3/1994 | |
| JP | 6-268548 | 9/1994 | |
| JP | 7-288567 | 10/1995 | |
| JP | 7-326248 | 12/1995 | |
| JP | 10-172379 | 6/1998 | |
| JP | 3060484 | 6/1999 | |
| JP | 2000-40434 | 2/2000 | |
| JP | 2000-182462 | 6/2000 | |
| WO | WO 85/05731 | 12/1985 | H01H/13/06 |

OTHER PUBLICATIONS

Japanese Office Action dated Oct. 15, 2002 with partial English translation.

* cited by examiner

Primary Examiner—Michael Friedhofer
(74) Attorney, Agent, or Firm—McGinn & Gibb, PLLC

(57) ABSTRACT

A structure of an electronic instrument having operation keys and a manufacturing method thereof, in which a dustproof and waterproof function can be secured by a simple structure, are provided. The structure of the electronic instrument having operation keys provides a cabinet providing an opening part for operation keys, the operation keys that are disposed in the opening part of the cabinet so that each of the operation keys is movable in the orthogonal direction to the front surface of the cabinet, and a resin film that covers the surface of the cabinet and the surfaces of the operation keys in the state that the resin film is not cut on the surfaces of the cabinet and the operation keys, and covers a gap formed between the cabinet and the operation keys, and gaps formed among the operation keys.

20 Claims, 10 Drawing Sheets

STRUCTURE OF ELECTRONIC INSTRUMENT HAVING OPERATION KEYS AND MANUFACTURING METHOD THEREOF

BACKGROUND OF THE INVENTION

The present invention relates to a structure of an electronic instrument having operation keys for, such as a telephone terminal and a portable calculator, and a manufacturing method thereof.

Description of the Related Art

FIG. 1 is a perspective view showing a conventional structure of an electronic instrument having operation keys. As shown in FIG. 1, the conventional structure of the electronic instrument provides an upper cabinet 1 and a lower cabinet 2 both formed by resin molding, operation keys 4 in an operating section 3, and a displaying section 6. And a key sheet 5 is composed of that the operation keys 4 are connected with a resin film covering the upper surfaces of the operation keys 4 one another.

Next, a manufacturing method of the key sheet 5 is explained. FIG. 2 is a sectional view showing a first manufacturing process of the key sheet 5 at the conventional structure of the electronic instrument shown in FIG. 1. First, a resin film 7, whose printing surface 8 designated images and figures were printed on, is put between an upper die 9 having the same shape surface that the cosmetic design surfaces of the operation keys 4 have and a first lower die 10 that has the shape reversed the upper die 9 and that the thickness of the resin film 7 is offset, and pressure is applied to the upper die 9 and/or the first lower die 10, and the resin film 7 is formed. In this, the resin film 7 is made of a thermoplastic resin material such as polyester, nylon, and polycarbonate, and the thickness of the resin film 7 is 50 micrometers to 100 micrometers.

FIG. 3 is a sectional view showing a second manufacturing process of the key sheet 5 at the conventional structure of the electronic instrument shown in FIG. 1. After the first manufacturing process mentioned above, as shown in FIG. 3, the first lower die 10 is replaced by a second lower die 11 whose upper surface is the same that the bottom surfaces of the operation keys 4 have, and a filler resin 13 such as an ABS resin and polycarbonate is injected from a gate 12 formed at the second lower die 11. FIG. 4 is a sectional view showing a third manufacturing process of the key sheet 5 at the conventional structure of the electronic instrument shown in FIG. 1. As shown in FIG. 4, the space between the printing surface 8 of the resin film 7 and the second lower die 11 is filled with the filler resin 13, after the filler resin 13 was hardened, both of the upper die 9 and the second lower die 11 are removed. FIG. 5 is a sectional view of the key sheet 5 at the conventional structure of the electronic instrument. As shown in FIG. 5, the key sheet 5 with the operation keys 4 is formed.

FIG. 6 is a sectional view showing a structure of the operating part at the conventional structure of the electronic instrument. As shown in FIG. 6, the operating part at the conventional structure consists of the upper cabinet 1, the key sheet 5 with the operation keys 4, a rubber sheet 14, dome shaped switches 15, and a printed circuit board (PCB) 16.

At the operating part at the conventional structure, the reason why the rubber sheet 14 is inserted between the key sheet 5 with the operation keys 4 and the PCB 16 is to prevent the PCB 16 and the dome shaped switches 15 from being corroded by that water and/or dust enter from a gap between the upper cabinet 1 and the key sheet 5.

At the conventional structure of the electronic instrument, as shown in FIG. 6, the key sheet 5 with the operation keys 4, which was formed by that the filler resin 13 was filled under the resin film 7, is set into the opening part of the upper cabinet 1.

However, at the conventional structure of the electronic instrument, there is a possibility that water and/or dust enter the inside of the electronic instrument from the gap between the key sheet 5 with the operation keys 4 and the upper cabinet 1. Therefore, the rubber sheet 14 is inserted between the key sheet 5 with the operation keys 4 and the PCB 16 to which the dome shaped switches 15 were mounted, and the water and/or dust are prevented from entering the inside of the electronic instrument. However, the key sheet 5 with the operation keys 4 is set into the opening part of the upper cabinet 1 in the state that the key sheet 5 with the operation keys 4 only presses the PCB 16, therefore, the water and/or the dust can not be entirely prevented from entering the inside of the electronic instrument. Furthermore, the number of the components is too large, and must be reduced in order to meet that the electronic instrument is small (thin) sized and light weighted.

SUMMARY OF THE INVENTION

It is therefore an object of the present invention to provide a structure of an electronic instrument having operation keys and a manufacturing method thereof, in which a dustproof and waterproof function can be secured by a simple structure.

According to a first aspect of the present invention for achieving the object mentioned above, there is provided a structure of an electronic instrument having operation keys. The structure of the electronic instrument having operation keys provides a cabinet providing an opening part for operation keys, operation keys that are disposed in the opening part of the cabinet so that each of the operation keys is movable in the orthogonal direction to the front surface of the cabinet, and a resin film that covers the surface of the cabinet and the surfaces of the operation keys in the state that the resin film is not cut on the surfaces of the cabinet and the operation keys, and covers a gap formed between the cabinet and the operation keys, and gaps formed among the operation keys.

According to a second aspect of the present invention, in the first aspect, designated images and figures are printed on the surface contacting the cabinet and the operation keys of the resin film.

According to a third aspect of the present invention, in the first aspect, the cabinet is divided into an upper cabinet and a lower cabinet and composed of the upper cabinet and the lower cabinet, and the operation keys are disposed in an opening part of the upper cabinet, and the edge part of the resin film is extended to the part where the upper cabinet and the lower cabinet are joined.

According to a fourth aspect of the present invention, in the first aspect, the cabinet provides a displaying part and the displaying part is at least transparent, and the part of the resin film where the displaying part is disposed is transparent.

According to a fifth aspect of the present invention, in the third aspect, the upper cabinet provides a displaying part and the displaying part is at least transparent, and the part of the resin film where the displaying part is disposed is transparent.

According to a sixth aspect of the present invention, in the first aspect, a printed circuit board in which switches contacting to each of the operation keys are mounted is provided in the cabinet.

According to a seventh aspect of the present invention, there is provided a manufacturing method of an electronic instrument having operation keys. At the manufacturing method of the electronic instrument having operation keys, the electronic instrument having operation keys provides a cabinet providing an opening part for operation keys, and operation keys that are disposed in the opening part of the cabinet so that each of the operation keys is movable in the orthogonal direction to the front surface of the cabinet, and a resin film is formed on a cavity plate having concave parts being the same shape of the outer shape of the cabinet and the outer shape of the operation keys at the state that the operation keys are disposed at the designated positions in the opening part of the cabinet by using a first core plate having convex parts (the concave parts are reversed and the thickness of the resin film is reduced) being the similar figure of the concave parts of the cavity plate by applying pressure. And after this, the first core plate is replaced with a second core plate, and empty spaces are formed between the cavity plate and the second core plate, and a resin material is filled in the empty spaces, and the cabinet and the operation keys are formed by the resin material, and a gap formed between the cabinet and the operation keys is covered with the resin film, and gaps formed among the operation keys are covered with the resin film.

According to an eighth aspect of the present invention, in the seventh aspect, designated images and figures are printed on the surface contacting to the cabinet and the operation keys of the resin film before the resin film is formed on the cavity plate.

According to a ninth aspect of the present invention, in the seventh aspect, the cabinet and the operation keys are formed by an injection molding when the resin material is injected into the empty spaces.

According to a tenth aspect of the present invention, there is provided a manufacturing method of an electronic instrument having operation keys. The manufacturing method of the electronic instrument having operation keys provides the steps of; placing a cavity plate having concave parts being the same shape of the outer shape of an upper cabinet and the outer shape of operation keys at the state that the operation keys are disposed at designated positions in an opening part of the upper cabinet, placing a resin film on the inside surface of the cavity plate in the state that the resin film is extended to the edge part of the cavity plate, placing a first core plate having convex parts (the concave parts are reversed and the thickness of the resin film is reduced) being the similar figure of the concave parts of the cavity plate on the resin film, and applying pressure to the resin film in the direction of the cavity plate through the first core plate, and forming the resin film on the cavity plate, removing the first core plate, placing a second core plate in the state that the second core plate faces with the resin film with empty spaces between the resin film and the second core plate, injecting a resin material from gates of the second core plate into the empty spaces, and removing the second core plate. And the upper cabinet and the operation keys are formed by the resin material, in the state that a gap formed between the upper cabinet and the operation keys is covered with the resin film, and gaps formed among the operation keys are covered with the resin material, and in the state that the resin film is extended to the part where the upper cabinet is fixed with a lower cabinet of the electronic instrument on the surface of the upper cabinet.

According to an eleventh aspect of the present invention, in the tenth aspect, the manufacturing method of the electronic instrument having operation keys further provides the step of; printing designated images and figures on the surface contacting to the upper cabinet and the operation keys of the resin film before the resin film is formed on the cavity plate.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
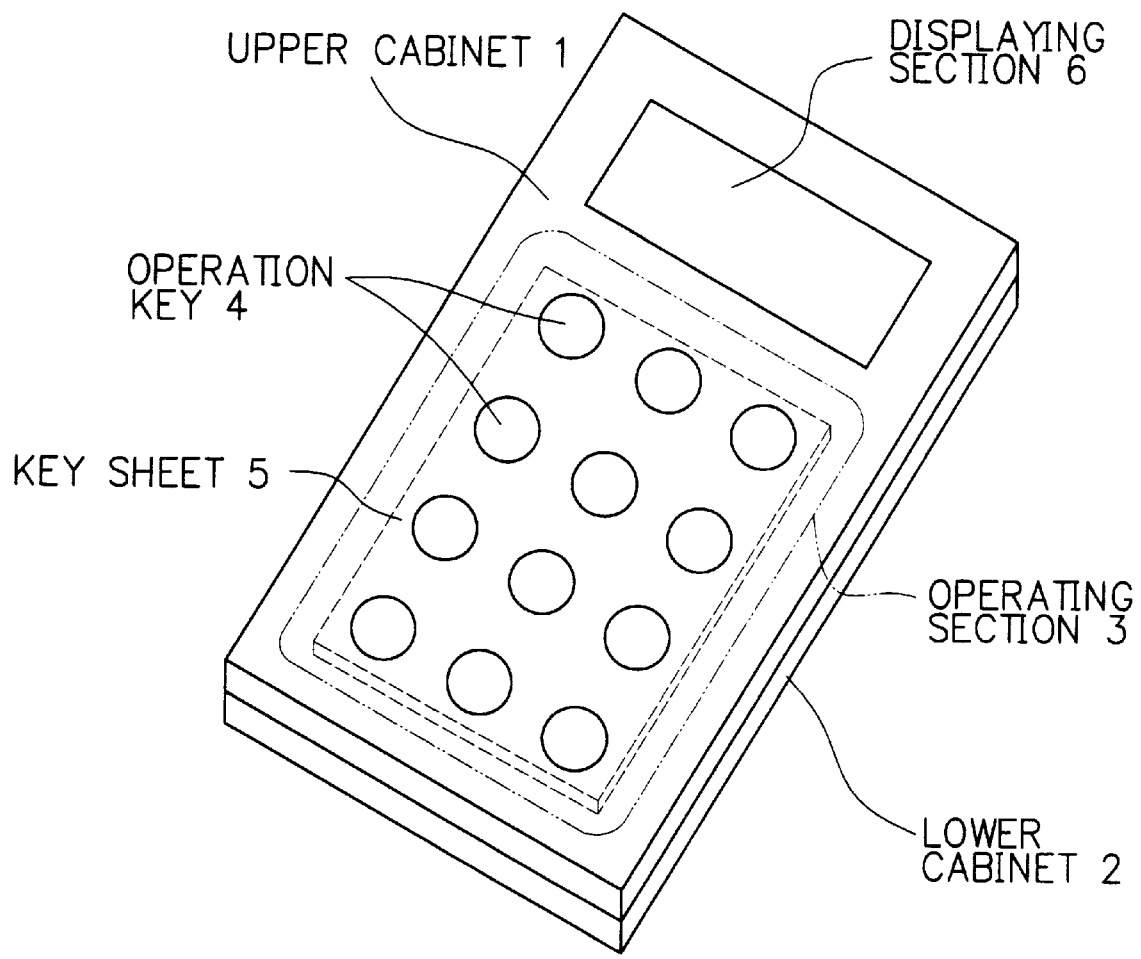
FIG. 1 is a perspective view showing a conventional structure of an electronic instrument having operation keys.
Figure 2:
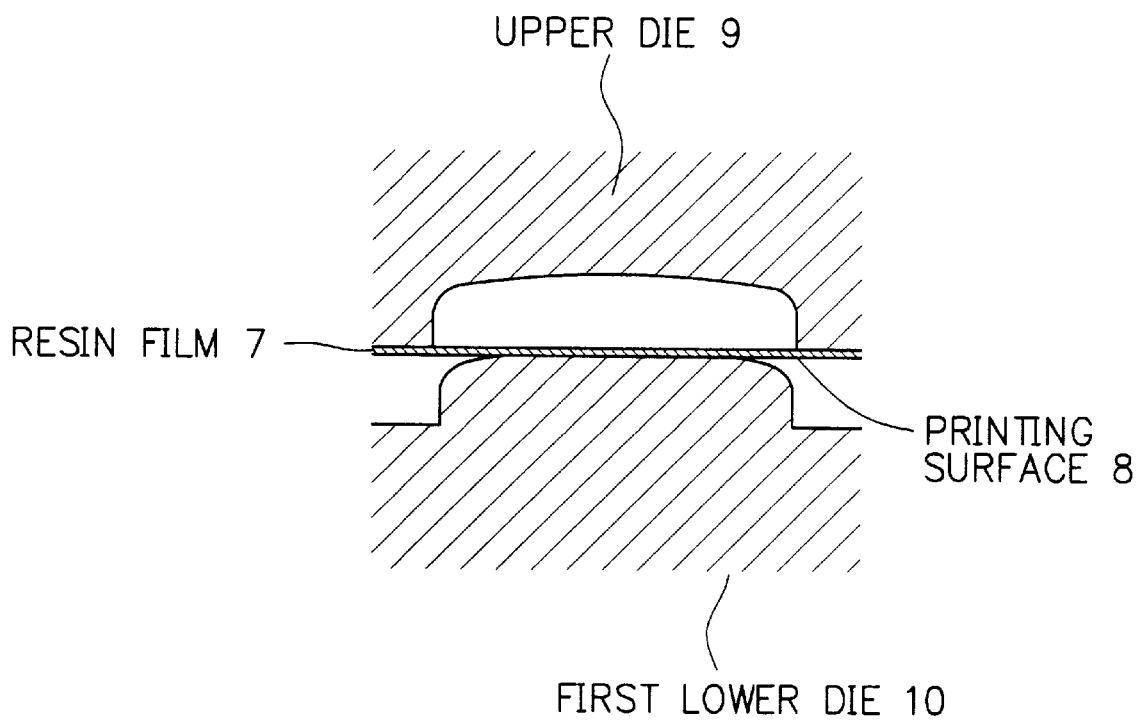
FIG. 2 is a sectional view showing a first manufacturing process of a key sheet at the conventional structure of the electronic instrument shown in FIG. 1.
Figure 3:
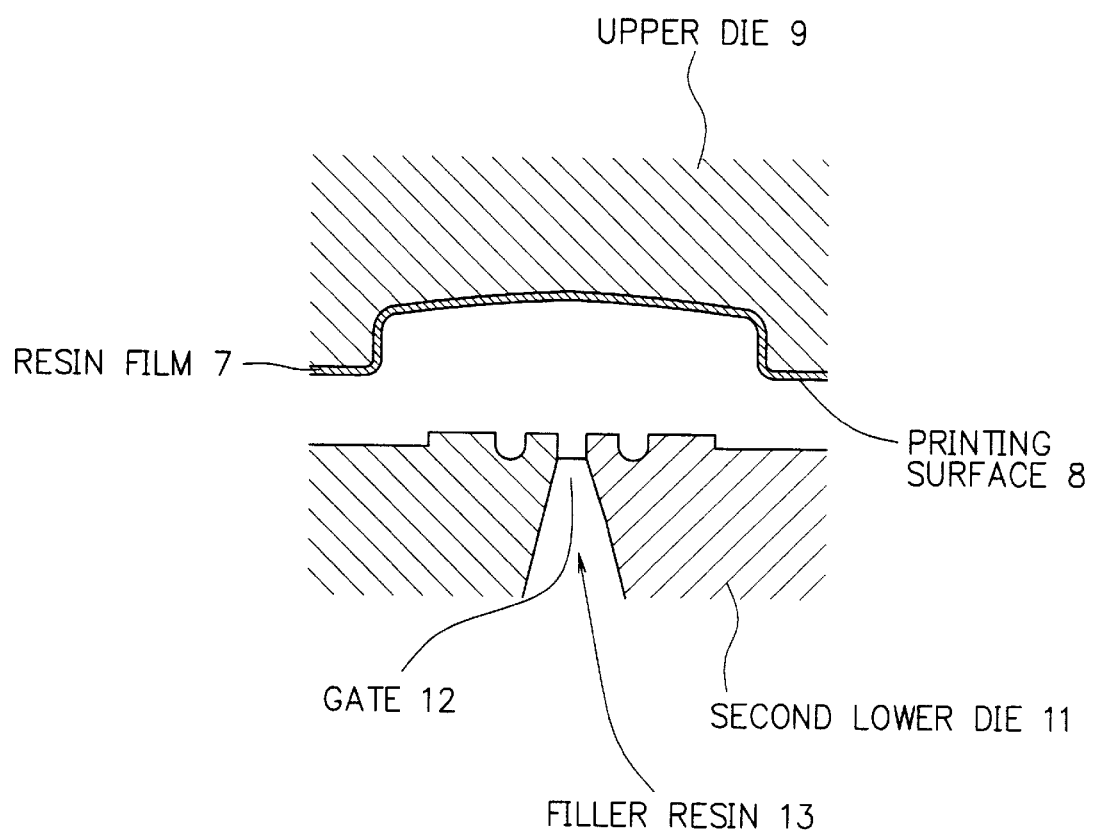
FIG. 3 is a sectional view showing a second manufacturing process of the key sheet at the conventional structure of the electronic instrument shown in FIG. 1.
Figure 4:
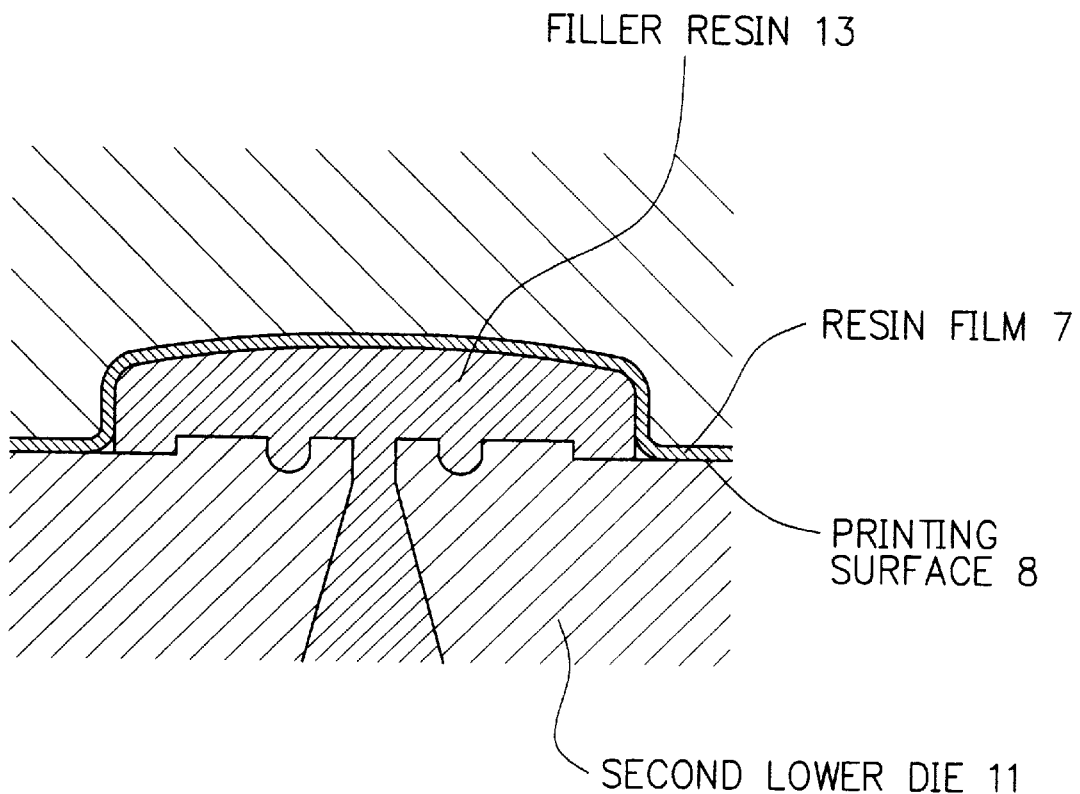
FIG. 4 is a sectional view showing a third manufacturing process of the key sheet at the conventional structure of the electronic instrument shown in FIG. 1.
Figure 5:
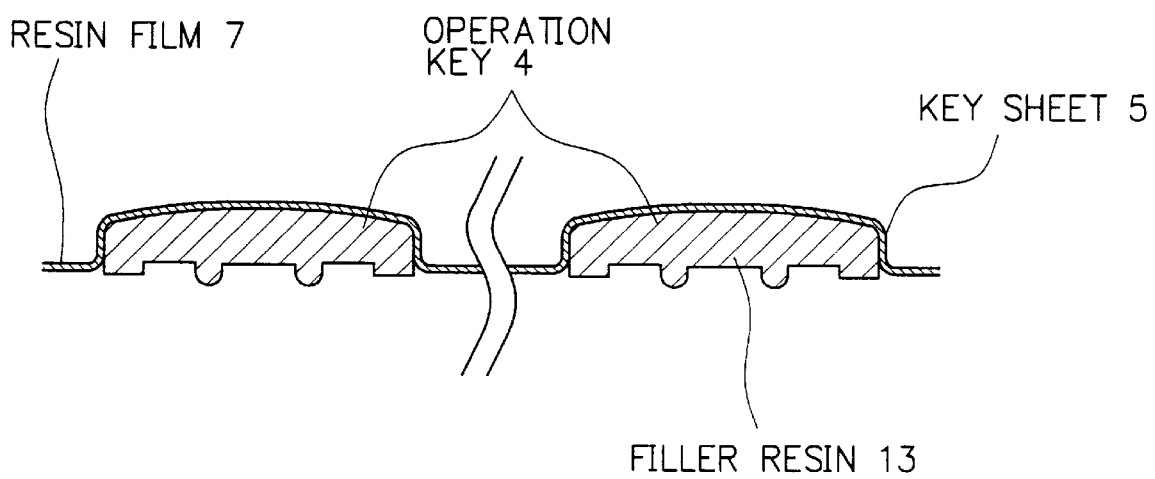
FIG. 5 is a sectional view of the key sheet at the conventional structure of the electronic instrument.
Figure 6:
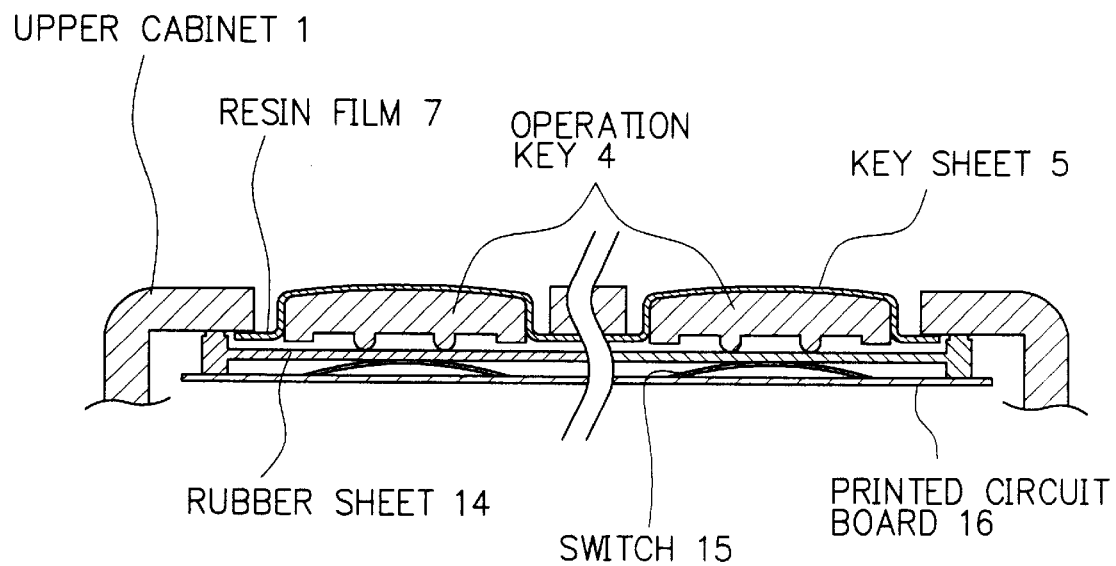
FIG. 6 is a sectional view showing a structure of the operating part at the conventional structure of the electronic instrument.

Referring now to the drawings, an embodiment of the present invention is explained in detail. In this, the same reference number used at the conventional structure is used in the structure of the present invention, at the case that the function is the same between them.

Figure 7:
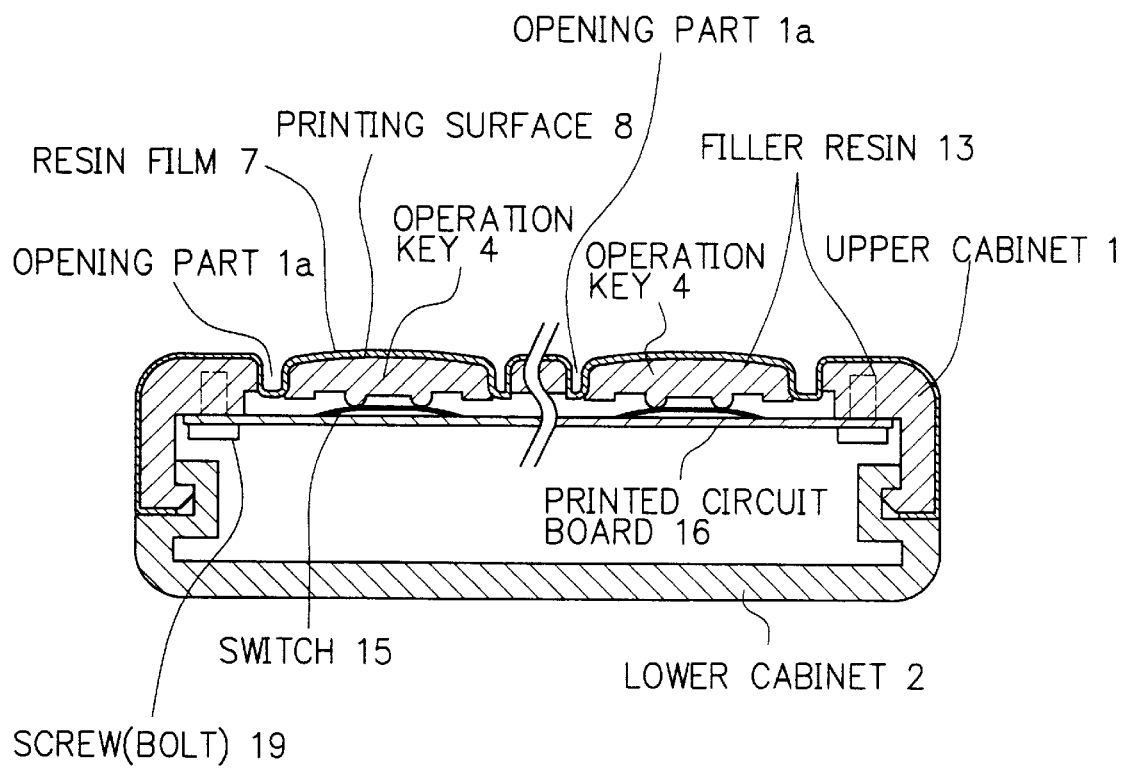
FIG. 7 is a sectional view showing a structure of an embodiment of an electronic instrument having operation keys of the present invention.

FIG. 7 is a sectional view showing a structure of an embodiment of an electronic instrument having operation keys of the present invention. As shown in FIG. 7, the structure of the embodiment of the electronic instrument having operation keys of the present invention provides an upper cabinet 1, a lower cabinet 2, and operation keys 4 that are disposed in an opening part 1a formed at the upper cabinet 1 in the state that each of the operation keys 4 is movable in the orthogonal direction to the front surface of the upper cabinet 1. And further a resin film 7 covers the front surface of the upper cabinet 1, the front surfaces of the operation keys 4, and also the gap between the upper cabinet 1 and the operation keys 4, and the gaps among the operation keys 4. In this, the gaps are a part of the opening part 1a of the upper cabinet 1. With this, the resin film 7 covers the front surfaces of the upper cabinet 1 and the operation keys 4 and also the gap formed between the upper cabinet 1 and the operation keys 4, and the gaps among the operation keys 4. And the operation keys 4 can move for the upper cabinet 1.

And as shown in FIG. 7, the edge part of the resin film 7 is extended to the part that the upper cabinet 1 and the lower cabinet 2 are jointed together on the surface of the upper cabinet 1. And at the state that the upper cabinet 1 and the lower cabinet 2 are assembled and jointed, the edge part of the resin film 7 is put between the upper cabinet 1 and the lower cabinet 2. With this, the surface of the electronic instrument having the operation keys 4 is prevented from that dust and/or water enter the inside of the electronic instrument.

And at the embodiment of the present invention, designated images and figures are printed on the printing surface 8 of the resin film 7. That is, the printing surface 8 is positioned at the upper surface of the upper cabinet 1 and the upper surfaces of the operation keys 4. In FIG. 7, a filler resin 13, switches 15, a PCB 16, and screws (bolts) 19 are explained later.

Figure 8:
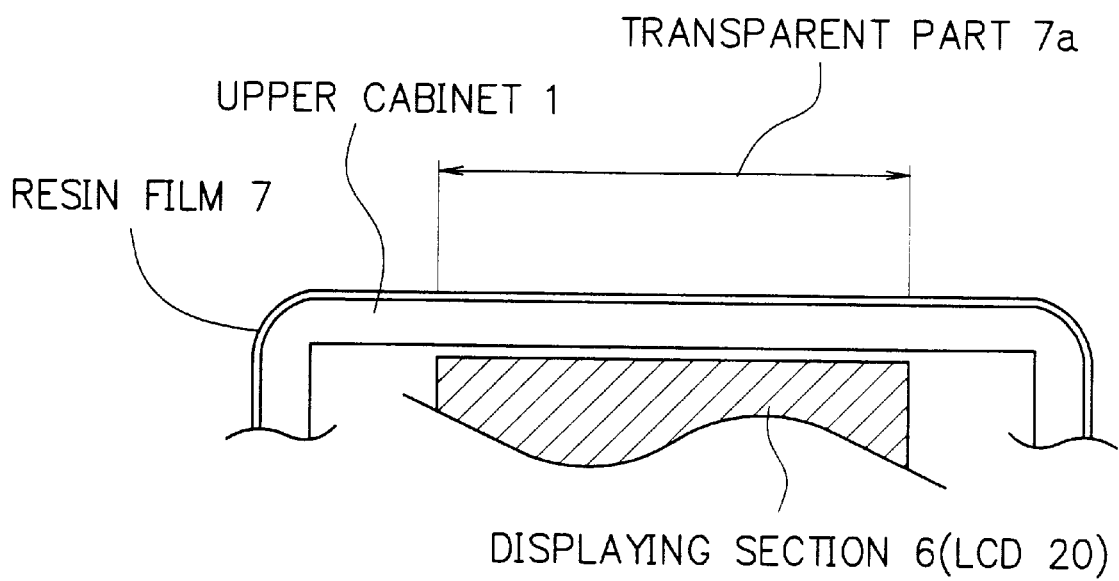
FIG. 8 is a sectional view showing a structure of the displaying part of the electronic instrument at the embodiment of the present invention.

FIG. 8 is a sectional view showing a structure of the displaying part of the electronic instrument at the embodiment of the present invention. As shown in FIG. 8, the upper cabinet 1 has a displaying section 6, and a resin film 7a disposed at the displaying section 6 is at least transparent. In FIG. 8, the displaying section 6 is made of a liquid crystal display (LCD) 20.

And as shown in FIG. 7, the PCB 16, on which the switches 15 to be contacted with each of the operation keys 4 are mounted, is fixed to the upper cabinet 1 by the screws (bolts) 19. And the upper cabinet 1 and the operation keys 4 are made of the filler resin 13.

Figure 9:
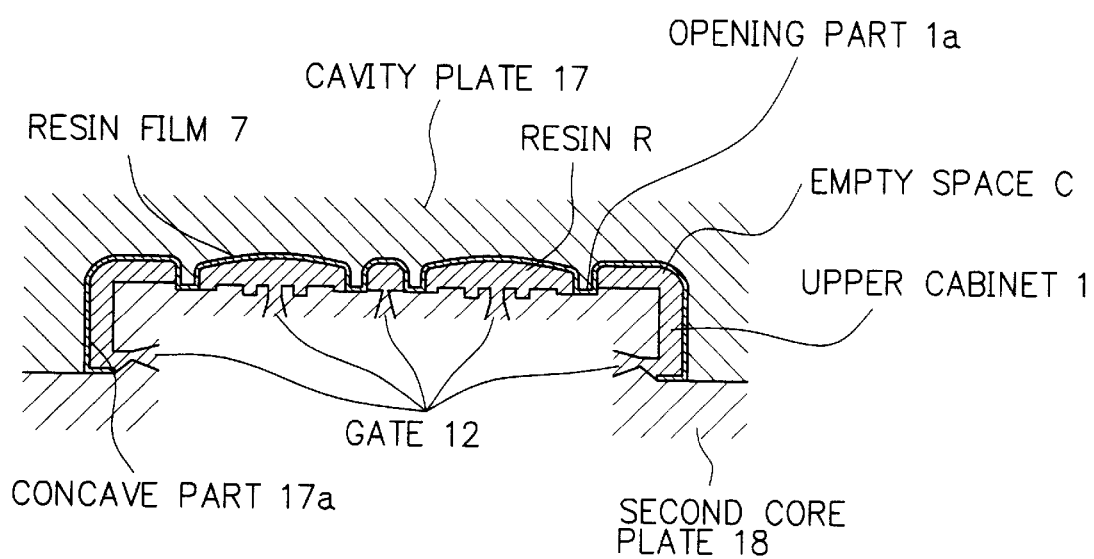
FIG. 9 is a sectional view showing a manufacturing method at the structure of the embodiment of the electronic instrument of the present invention.

Next, a manufacturing method of the electronic instrument at the embodiment of the present invention is explained. FIG. 9 is a sectional view showing a manufacturing method at the structure of the embodiment of the electronic instrument of the present invention.

First, the resin film 7 is formed to the shape of the outer surface of the upper cabinet 1 and the front surfaces of the operation keys 4 by applying pressure by using a cavity plate 17 and a first core plate (not shown). In this, the cavity plate 17 has the concave parts 17a being the same outer shape of the upper cabinet 1 and the outer shape of the operation keys 4 at the state that the operation keys 4 are put at the designated positions in the opening part 1a of the upper cabinet 1. And the first core plate has convex parts being the similar figure of the concave parts 17a of the cavity plate 17. That is, the convex parts of the first core plate have the shape that the concave parts of the cavity plate 17 are reversed and the thickness of the resin film 7 is reduced. After this, the first core plate is removed and a second core plate 18 is positioned under the resin film 7. With this, empty spaces C, in which the upper cabinet 1 and the operation keys 4 are formed, are formed between the cavity plate 17 and the second core plate 18. And the empty spaces C are filled with a resin R by that the resin R is injected from gates 12 formed at the second core plate 18. And the upper cabinet 1 and the operation keys 4 are formed, and also the resin film 7 is unified with the upper cabinet 1 and the operation keys 4. Consequently, the operation keys 4 are connected to the upper cabinet 1 by putting the resin film 7 between them in the state that the operation keys 4 are movable for the upper cabinet 1. And the gap between the upper cabinet 1 and the operation keys 4 and the gaps among the operation keys 4 are covered with the resin film 7, therefore, the hermetic state of the electronic instrument can be secured.

At the embodiment of the electronic instrument having the structure mentioned above, there is the resin film 7 between the upper cabinet 1 and the operation keys 4 in the state that the resin film 7 is not cut between them. Therefore, the gap between the upper cabinet 1 and the operation keys 4 does not exist, and also the gaps among the operation keys 4 do not exist. Consequently, dust and/or water do not enter the inside of the electronic instrument, and the rubber sheet 14, which is used to prevent the dust and/or water form entering at the conventional electronic instrument, is not required any more. With this, the electronic instrument can be small (thin) sized and light weighted.

And at the embodiment of the present invention, the operation keys 4 and the upper cabinet 1 become one component, and the rubber sheet 14 using at the conventional electronic instrument becomes unnecessary. Therefore, the number of components is reduced from three to one, that is, from the separated the upper cabinet 1, the key sheet 5, and the rubber sheet 14 to one assembled upper cabinet 1 including the operation keys 4. Consequently, it becomes easy to manufacture the electronic instrument, and also the efficiency at the mass production can be improved.

At the conventional dustproof and waterproof structure using the rubber sheet 14, there may occur some gaps at the position between the rubber sheet 14 and the PCB 16, and the position between the rubber sheet 14 and the upper cabinet 1 depending on the degree of accuracy of the sizes at that the rubber sheet 14 is formed and the rubber sheet 14 and the PCB 16 are assembled. Consequently, there is a case that the electronic instrument can not be used by that the PCB 16 is corroded by that water and/or dust enter the inside of the electronic instrument.

However, at the embodiment of the present invention, there are no gaps between the upper cabinet 1 and the operation keys 4, and among the operation keys 4. Therefore, the water and/or dust can be prevented from entering the inside of the electronic instrument.

And designated images and figures are printed on the printing surface 8 of the resin film 7 beforehand, and after this, the upper cabinet 1 and the operation keys 4 are formed under the printing surface 8 of the resin film 7 by molding. Therefore, it becomes unnecessary that the upper cabinet 1 is painted.

At the conventional electronic instrument, the molded cabinet is painted and after this designated images and figures are printed on the upper surface of the cabinet. At this time, at the case that positioning accuracy for the printing is required, the surface of the cabinet, on which the images and figures are printed, must be formed as a flat surface.

However, at the present invention, the designated images and figures are printed on the printing surface 8 of the resin film 7 beforehand, and the resin film 7 with the designated images and figures is formed by the cavity plate 17 so that the surface of the resin film 7 becomes the surface of the upper cabinet 1 and the operation keys 4. Therefore, the designated images and figures are formed even on the curved surface of the upper cabinet 1 with keeping the positioning accuracy. Furthermore, the printing surface 8 of the resin film 7 is positioned at the inside of the electronic instrument, therefore the printed images and figures are not worn and any treatment to prevent from wearing is not required.

Figure 10:
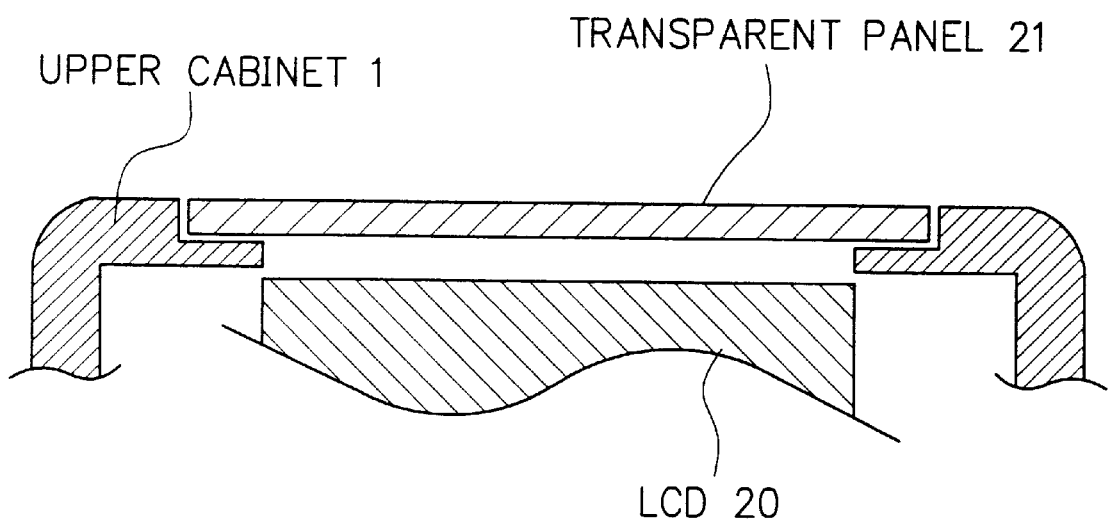
FIG. 10 is a sectional view showing the part fixing an LCD to the conventional electronic instrument.

As shown in FIG. 8, the resin film 7, whose part only on the surface of the LCD 20 is transparent, can be used. And also the upper cabinet 1 can be made of a transparent resin. FIG. 10 is a sectional view showing the part fixing the LCD 20 to the conventional electronic instrument. As shown in FIG. 10, at the conventional electronic instrument, in order to protect the LCD 20 from damaging, it is required that a transparent panel 21 is fixed at the opening part of the upper cabinet 1. And there is a case that the water and/or dust enter the inside of the electronic instrument from the gap between the upper cabinet 1 and the transparent panel 21.

However, at the present invention, it is not necessary that the transparent panel 21 is fixed at the opening part of the upper cabinet 1, and also the water and/or dust can be prevented from entering the inside of the electronic instrument from the opening part of the upper cabinet 1. Consequently, the assembling the electronic instrument can be improved at the present invention because the transparent panel 21 is not required at the opening part of the upper cabinet 1.

As mentioned above, according to the present invention, operation keys and an upper cabinet is covered with a resin film, and the upper cabinet and a lower cabinet are joined tightly by putting the resin film between the upper cabinet and the lower cabinet. Therefore, gaps do not exist on the surface of the cabinet of the electronic instrument having the operation keys. Consequently, dust and/or water do not enter the inside of the electronic instrument, and a rubber sheet, which is conventionally used to prevent the dust and/or water from entering the inside of the electronic instrument, is not required, therefore the electronic instrument can be made to be small (thin) sized and light weighted.

And the operation keys and the upper cabinet become one component, and the rubber sheet at the conventional electronic instrument becomes unnecessary. Therefore, the number of components is reduced to one assembled component from the separated the upper cabinet, a key sheet, and the rubber sheet. Consequently, it becomes easy to manufacture the electronic instrument, and also the efficiency at the mass production can be improved.

And designated images and figures are printed on the printing surface of the resin film beforehand, and the resin film with the images and figures is formed by a cavity plate so that the surface of the resin film becomes the surfaces of the upper cabinet and the operation keys. Therefore, it is not required that the cabinet is pained.

And a transparent resin film is used on the displaying section and also the cabinet can be made of a transparent resin material. With this, the dust and/or water can be prevented from entering the inside of the electronic instrument from the displaying section. And assembling the electronic instrument can be improved.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. An electronic instrument having operation keys, comprising:
    a cabinet providing an opening part for said operation keys, said operation keys being disposed in said opening part of said cabinet so that each of said operation keys is movable in an orthogonal direction to a front surface of said cabinet; and
    a resin film that covers the front surface of said cabinet and front surfaces of said operation keys in a state that said resin film is not cut on the front surface of said cabinet and said front surfaces of said operation keys, and covers a gap formed between said cabinet and said operation keys, and gaps formed among said operation keys.

2. An electronic instrument having operation keys in accordance with claim 1, wherein designated images and figures are printed on a surface of said resin film contacting said cabinet and said operation keys.

3. An electronic instrument according to claim 2, wherein said printing surface of said resin film is positioned inside said electronic instrument.

4. A structure of an electronic instrument having operation keys in accordance with claim 1, wherein:
    a printed circuit board in which switches contacting to each of said operation keys are mounted is provided in said cabinet.

5. An electronic instrument according to claim 4, wherein said printed circuit board is fixed to an upper cabinet by fasteners.

6. An electronic instrument according to claim 1, wherein said resin film is said front surface of said cabinet and said front surface of said operation keys.

7. An electronic instrument according to claim 1, wherein said cabinet is divided into an upper cabinet and a lower cabinet and comprising said upper cabinet and said lower cabinet, and said operation keys are disposed in said opening part of said upper cabinet.

8. The electronic instrument according to claim 7, wherein an edge portion of said resin film is extended to an interface where said upper cabinet and said lower cabinet are joined.

9. An electronic instrument according to claim 7, wherein said operation keys and said upper cabinet are integrally formed.

10. An electronic instrument according to claim 1, wherein said cabinet provides a displaying part and said displaying part is at least transparent.

11. An electronic instrument having operation keys comprising:
    a cabinet providing an opening part for said operation keys, said operation keys being disposed in said opening part of said cabinet so that each of said operation keys is movable in an orthogonal direction to a front surface of said cabinet; and
    a resin film that covers the front surface of said cabinet and front surfaces of said operation keys in a state that said resin film is not cut on the front surface of said cabinet and said front surfaces of said operation keys, and covers a gap formed between said cabinet and said operation keys, and gaps formed among said operation keys, and
    wherein said cabinet is divided into an upper cabinet and a lower cabinet and comprising said upper cabinet and said lower cabinet, and said operation keys are disposed in said opening part of said upper cabinet, and an edge part of said resin film is extended to an interface where said upper cabinet and said lower cabinet are joined.

12. A structure of an electronic instrument having operation keys in accordance with claim 11, wherein said upper cabinet provides a displaying part and said displaying part is at least transparent, and said resin film is transparent where said displaying part is disposed.

13. An electronic instrument according to claim 11, wherein said upper cabinet and said operation keys comprise a filler resin.

14. An electronic instrument having operation keys comprising:

a cabinet providing an opening part for said operation keys, said operation keys being disposed in said opening part of said cabinet so that each of said operation keys is movable in an orthogonal direction to a front surface of said cabinet; and a resin film covers the front surface of said cabinet and front surfaces of said operation keys in a state that said resin film is not cut on the front surface of said cabinet and said front surfaces of said operation keys, and covers a gap formed between said cabinet and said operation keys, and gaps formed among said operation keys, and wherein said cabinet provides a displaying part and said displaying part is at least transparent, and said resin film is transparent where said displaying part is disposed.

15. An electronic instrument having operation keys according to claim 14, wherein said displaying portion comprises a liquid crystal display.

16. A manufacturing method of an electronic instrument having operation keys, comprising:

providing a cabinet with an opening part for said operation keys;

disposing said operation keys in said opening part of said cabinet so that each of said operation keys is movable in an orthogonal direction to a front surface of said cabinet;

forming a resin film on a cavity plate having concave parts comprising substantially a shape as an outer shape of said cabinet and the outer shape of said operation keys when said operation keys are disposed at a designated position in said opening part of said cabinet by using a first core plate having convex parts comprising a figure which is similar to said concave parts of said cavity plate by applying pressure, said concave parts being reversed and the thickness of said resin film being reduced;

replacing said first core plate with a second core plate;

forming empty spaces between said cavity plate and said second core plate; and filling a resin material in said empty spaces, said cabinet and said operation keys being formed by said resin material, a gap formed between said cabinet and said operation keys being covered with said resin film, and gaps formed among said operation keys being covered with said resin film.

17. A manufacturing method of an electronic instrument having operation keys in accordance with claim 16, wherein designated images and figures are printed on a surface of said resin film contacting said cabinet and said operation keys before said resin film is formed on said cavity plate.

18. A manufacturing method of an electronic instrument having operation keys in accordance with claim 16, wherein said cabinet and said operation keys are formed by an injection molding when said resin material is injected into said empty spaces.

19. A manufacturing method of an electronic instrument having operation keys, comprising:

placing a cavity plate having concave parts comprising a shape which is substantially the same as an outer shape of an upper cabinet and the outer shape of said operation keys when said operation keys are disposed at designated positions in an opening part of said upper cabinet;

placing a resin film on an inside surface of said cavity plate in the state that said resin film is extended to an edge part of said cavity plate;

placing a first core plate having convex parts comprising a figure which is similar to said concave parts of said cavity plate on said resin film, said concave parts being reversed and the thickness of said resin film being reduced;

applying pressure to said resin film in a direction of said cavity plate through said first core plate, and forming said resin film on said cavity plate;

removing said first core plate;

placing a second core plate where said second core plate faces said resin film with empty spaces between said resin film and said second core plate; and injecting a resin material from gates of said second core plate into said empty spaces; and removing said second core plate, wherein said upper cabinet and said operation keys are formed by said resin material, that were a gap formed between said upper cabinet and said operation keys is covered with said resin film, and gaps formed among said operation keys are covered with said resin material, and were said resin film is extended to an interface where said upper cabinet is fixed with a lower cabinet of said electronic instrument.

20. A manufacturing method of an electronic instrument having operation keys in accordance with claim 19, further comprising the step of:

printing designated images and figures on the surface contacting to said upper cabinet and said operation keys of said resin film before said resin film is formed on said cavity plate.

* * * * *